United States Patent [19]

Tafara

[11] Patent Number: 4,490,253
[45] Date of Patent: Dec. 25, 1984

[54] FILTER BAG WITH REMOVABLE RING AND HANDLE AND METHOD OF ASSEMBLY THEREFOR

[76] Inventor: Peter T. Tafara, 4803 Spring St., Neptune, N.J. 07753

[21] Appl. No.: 485,001

[22] Filed: Apr. 14, 1983

[51] Int. Cl.³ ............................................. B01D 29/14
[52] U.S. Cl. .................... 210/238; 210/452; 210/455; 210/470; 55/378; 55/DIG. 5; 29/451; 29/453
[58] Field of Search ............... 210/232, 236, 237, 238, 210/445, 447, 448, 451, 452, 453, 454, 455, 470, 471, 473, 495, 450, 541, 542, 497.2; 55/357, 378, 379, 381, DIG. 5, 492, 493; 29/163.5 F, 451, 453

[56] References Cited

U.S. PATENT DOCUMENTS

| | | | |
|---|---|---|---|
| 3,542,202 | 11/1970 | Ball | 210/232 |
| 3,640,392 | 2/1972 | Smith et al. | 210/232 |
| 3,774,769 | 11/1973 | Smith | 210/232 |
| 3,814,261 | 6/1974 | Morgan, Jr. | 210/232 |
| 4,081,379 | 3/1978 | Smith | 210/232 |
| 4,157,964 | 6/1979 | Rishel | 210/238 |
| 4,253,959 | 3/1981 | Tafara | 210/232 |
| 4,303,519 | 12/1981 | Del Vecchio | 210/238 |
| 4,390,425 | 6/1983 | Tafara et al. | 210/232 |

*Primary Examiner*—Peter Hruskoci
*Assistant Examiner*—Wanda L. Millard
*Attorney, Agent, or Firm*—Sachs & Sachs

[57] ABSTRACT

A filter bag with removable ring and handle suitable for use with high pressure filter housings includes a two-piece ring which is assembled together with a filter bag without the need for stitching or welding and includes a handle as an integral part of one of the rings to facilitate removal of the filter bag from a filter housing.

A method of assembling a filter bag with a removable ring and handle for removal of the filter from a filter housing is disclosed.

12 Claims, 6 Drawing Figures

FILTER BAG WITH REMOVABLE RING AND HANDLE AND METHOD OF ASSEMBLY THEREFOR

BACKGROUND OF THE INVENTION

1. Field of the Invention

The present invention relates to filters, and in particular, to a filter bag assembly suitable for use in high-pressure filter housings and includes a handle to facilitate removal therefrom.

2. Discussion of the Relevant Art

Many different filters are in use today in high-pressure filter applications. These industrial filters are designed to remove particles from liquid flowing therethrough in the range of between ten and one hundred microns in diameter. In order to insure the micron rating of the filter elements, it becomes necessary to reduce the number of "pinholes" occurring in the construction of the filter bag assembly. Holes caused by stitching used in the fabrication of the filter bag frequently causes the filter bag to exceed the specification (the particle size that the material is capable of filtering) of the filter material. Therefore, the efficiency of the filter bag is substantially reduced.

Typical filter housings in which these filter bag assemblies are utilized are disclosed in U.S. Pat. No. 4,253,959 issued to P. T. Tafara on Mar. 3, 1981 and U.S. Pat. No. 4,390,425 issued to P. T. Tafara, et al on June 28, 1983. The filter bags as used therein do not include a handle or other device for easy removal of the filter bag once it gets filled with contaminant (filtered particles) and requires that the support ring which holds the filter bag in position to be stitched to the filter bag, thus limiting the efficiency of the filter.

SUMMARY OF THE INVENTION

Therefore, it is an object of the present invention to provide a filter bag assembly which reduces and/or eliminates the use of stitching in the fabrication of the filter bag.

It is another object of the present invention to provide a filter bag assembly wherein the filter bag has retained therein a ring or collar suitable for use with pressurized filter vessels without utilizing stitching and the forming of needle holes when the rings are sewn to the filter bag.

Another object of the present invention is to provide a filter bag assembly that includes a handle so that the filter bag assembly may be removed from a filter vessel in an expeditious manner.

It is yet another object of the present invention to provide a filter bag assembly that can maintain its efficiency consistent with the filter material used for the filter.

The present invention overcomes the shortcomings found in the known art, by providing a filter bag assembly which is fabricated of non-metallic parts, is suitable for use under relatively high pressures and is capable of retaining the filtering specifications of the filter material after assembly.

A filter bag assembly, according to the principles of the present invention, suitable for use in high-pressure filter housings, comprises: a filter bag having one closed end and one open end; a first ring having a generally rectangularly-shaped cross-section; and a second ring, the second ring in cross-section having a generally flat top portion with an externally extending lip portion. The externally extending lip portion is adapted to rest upon an inwardly extending portion provided in the filter housing sandwiching the filter bag therebetween. The second ring further includes a vertically depending portion disposed beneath the flat top portion and is provided with an inwardly extending shelf portion disposed proximate the flat top portion. A generally horizontal inwardly extending lip portion terminates the vertical depending portion. The first ring is adapted to be received within the channel formed in the second ring by the shelf portion, the vertically depending portion, and the lip portion, retaining the filter bag therebetween.

A method of assembling a filter bag with a removable ring and handle, according to the principles of the present invention, comprises the steps of: providing a tubular filter bag having open ends; providing a first ring generally rectangular in cross-section; providing a second ring, the second ring in cross-section having, a generally flat top portion with an externally extending lip portion, a vertically depending portion disposed beneath the flat top portion, the vertically depending portion being provided with an inwardly extending shelf portion disposed proximate the flat top portion, and a generally horizontal inwardly extending lip portion terminating the vertically depending portion, the first ring being adapted to be received within the channel formed in the second ring by the shelf portion, the vertically depending portion and the lip portion; placing one end of the filter bag within the first ring; wrapping one end of the filter bag around the first ring to cover the outer circumference thereof; inserting the wrapped first ring into the channel formed in the second ring; pulling the other open end of the filter bag over the flat top portion of the second ring to completely encompass the flat top portion; and closing the other open end of the filter bag.

The foregoing and other objects and advantages will appear from the description to follow. In the description references made to the accompanying drawing which forms a part hereof, and in which is shown by way of illustration a specific embodiment in which the invention may be practiced. This embodiment will be described in sufficient detail to enable those skilled in the art to practice the invention and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing, in which.

DESCRIPTION OF THE PREFERRED EMBODIMENT

Figure 1:
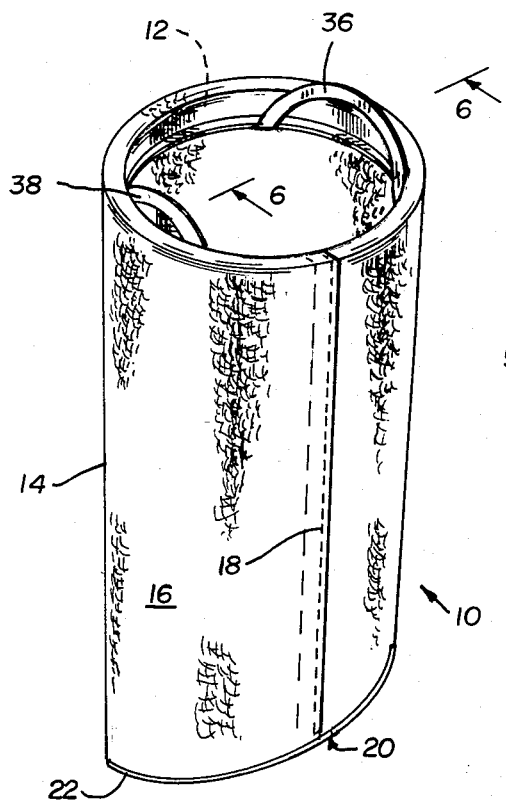
FIG. 1 is a pictorial representation of a filter bag assembly, according to the principles of the present invention.

Referring now to the figures and, in particular, to FIG. 1, there is shown a filter bag assembly 10 having a top collar or ring 12 which is completely covered by a filter bag 14. The filter bag 14 may be fabricated from any suitable material having a porosity consistent with the micron rating of the particles to be filtered out of a liquid flowing therethrough. Preferably, the material is between 0.060 to 0.080 inches in thickness (0.152 to 0.20 centimeters) and may be fabricated from numerous materials presently available. The material 16 used for the filter bag 14 preferably may be tubular in shape having both ends open or may be provided on bolts which are cut in fixed lengths, not shown, which are then folded in half and stitched with a plurality of stitches 18 along its longitudinal axis to form a tube. One end 20 of the tube may be stitched or preferably heat-sealed or welded forming a closed, stitch-free weld joint 22. The stitching 18 may also be replaced by a weld joint, especially if the bag is fabricated from a fluorocarbon material which may readily be subjected to sealing or cold heat flow with the application of the proper amount of heat and pressure applied thereto.

Figure 3:
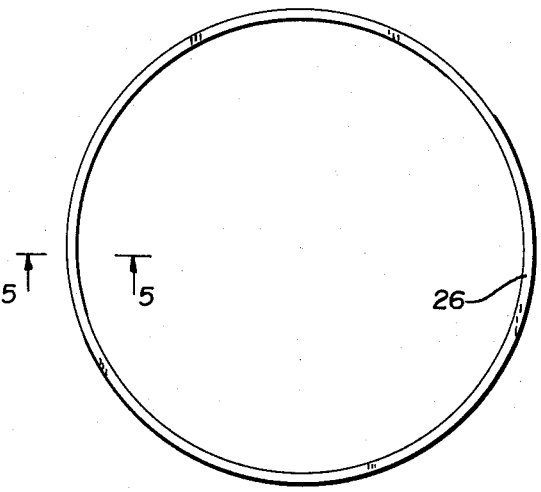
FIG. 3 is top plan view of a second ring used together with the ring in FIG. 2 to form the ring or collar portion of a filter bag assembly.
Figure 2:
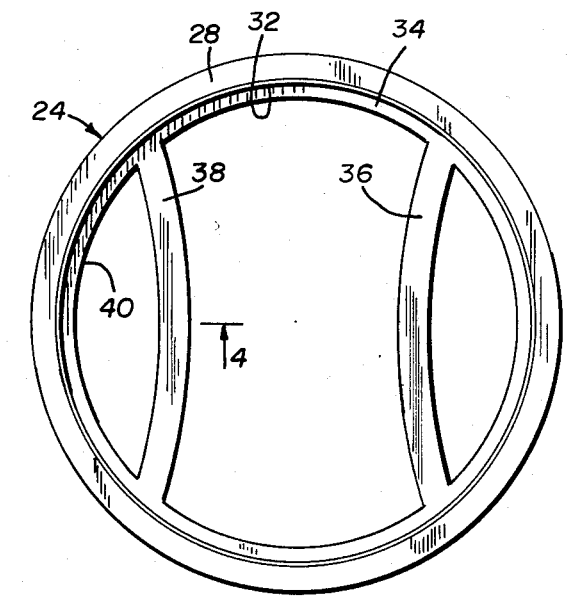
FIG. 2 is a top plan view of the first ring.
Figure 4:
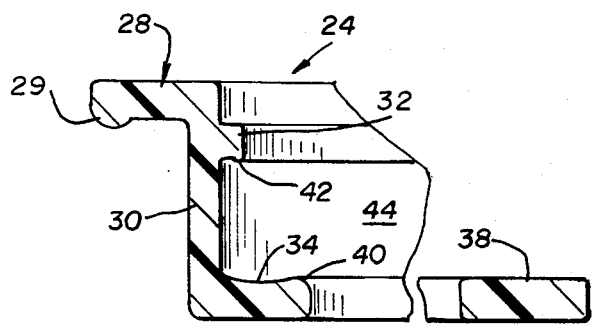
FIG. 4 is an enlarged cross-sectional view taken along lines 4—4 of FIG. 2.
Figure 6:
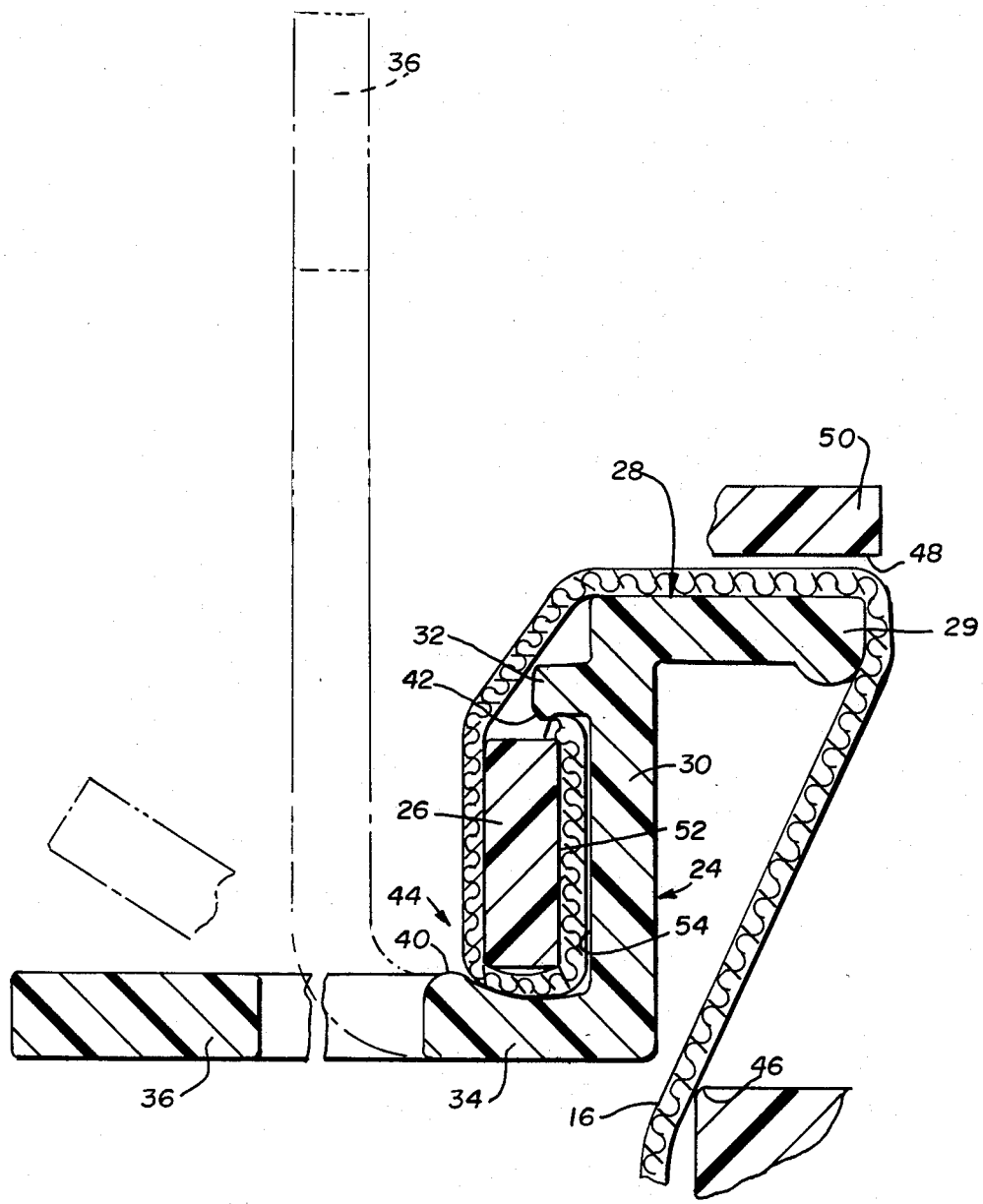
FIG. 6 is an enlarged cross-sectional view taken along the line of 6—6 of FIG. 1.

The collar or ring 12 includes a pair of rings 24 and 26 as shown in FIGS. 2 and 3, respectively. FIG. 4 is a cross-sectional view in elevation, along the line 4—4 of FIG. 2 and it can be seen that ring 24 includes a flat top portion 28 and a depending vertical portion 30, which is provided with a shelf portion 32 disposed proximate the flat top portion 28 and is terminated by an inwardly extending lip portion 34. Lip portion 34 is provided with a pair of integrally molded handles 36 and 38 that extend inwardly and may be raised to an essentially vertical position as shown in FIG. 6 when removing the filter bag assembly from its location in a filter vessel or housing, not shown. The lip portion 34 may be provided with an upwardly extending protrusion 40 together with a downwardly extending protrusion 42 provided on the shelf portion 32 to help retain the ring 26 provided by the channel bounded by the shelf portion 32, vertical depending portion 30, and lip portion 34, which will be explained hereinafter.

Figure 5:
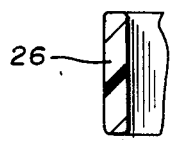
FIG. 5 is a cross-sectional view taken along the line of 5—5 in FIG. 3.

FIG. 3 is a top plan view of the other ring 26 and FIG. 5 is a cross-sectional view in elevation taken across line 5—5 of FIG. 3 showing the essentially rectangular cross-section of ring 26.

Referring now to FIG. 6, which is a greatly enlarged cross-sectional view taken along the line 6—6 of FIG. 1. Ring 26 has filter bag 16 wrapped around it and inserted into the channel 44 with both ends of the tubularly formed bag 16 remaining open. Once the ring 26 and bag 16 is inserted into the channel 44, it is retained therein by virtue of the dimensions selected therefor and the aid of the protrusions 40 and 42. The other end 20 of the filter bag 16 is then pulled over the top portion 28 and externally extending lip portion 29 of ring 24, totally encompassing the external portion 29, and pulled taut and placed together. The end 20 may then be stitched as at 18 or preferably welded as at 22, thereby maintaining the integrity of the filter bag 16. Using completely welded seams throughout will permit the micron rating of the filter bag to remain identical to the micron rating of the filter material used to fabricate the filter bag 16.

Thus, by utilizing a pair of rings as shown in FIGS. 2 and 3 to form the rigid collar assembly utilized on filter bag assembly 10, no stitching need be used to hold the filter bag 16 to the ring or collar 12. Preferably, the rings or collar 12 are fabricated from a fluorocarbon such as polypropylene, Teflon, or polyetheline.

In operation, the filter bag is assembled in the manner just described and may be inserted into a filter housing, not shown. With the configuration as disclosed herein, the filter bag assembly provides sealing of the area surrounding the bag so that liquid flowing in the filter housing is prevented from by-passing the filter bag 16 at point 46 which is a corner provided on a shelf of a filter vessel or housing, not shown. A lip 48 provided on a filter cover 50 applies pressure to the filter bag 16, sandwiching the bag between the externally extending lip portion 29 at the lower surface 48 of the filter vessel cover portion 50. A third seal is provided between the outer circumference 52 and the inner surface 54 of the depending vertical portion 30. Thus, an effective filter bag assembly is provided for high pressure applications while maintaining the integrity of the filter material rating.

A template in the shape of the end 20 of filter bag 16 may be utilized in order to insure that the shape of the bag is uniform from bag to bag.

Hereinbefore has been disclosed a filter bag assembly suitable for use in high-pressure filter vessels and a method for the assembly thereof which maintains the integrity of the micron rating of the filter material selected and is capable of being removed from a filter vessel with the aid of integrally provided handles. It will be understood that various changes in the details, materials, arrangement of parts and operating conditions which have been herein described and illustrated in order to explain the nature of the invention may be made by those skilled in the art within the principles of scope of the instant invention.

Having thus set forth the nature of the invention, what is claimed is:

1. A filter bag assembly suitable for use in high pressure filter housings for filtering liquids that pass therethrough, comprising:
   (A) a tubular filter bag having one closed end and one open end;
   (B) a first ring having a generally rectangularly-shaped cross-section; and
   (C) a second ring, said second ring in cross-section having;
      (i) a generally flat top portion with an externally extending lip portion, said externally extending lip portion being adapted to rest upon an inwardly extending portion provided in said filter housing sandwiching said filter bag therebetween;
      (ii) a depending vertical portion disposed beneath said flat top portion, said vertically depending portion having an inwardly extending shelf portion disposed proximate said flat top portion, and
      (iii) a generally horizontal inwardly extending lip portion terminating said vertically depending portion;

said first ring being adapted to be received within the channel formed in said second ring by said shelf portion, said depending vertical portion, and said lip portion retaining said filter bag therebetween.

2. A filter bag assembly according to claim 1 further including an integrally formed inwardly extending handle disposed on the inwardly extending lip portion of said second ring.

3. A filter bag assembly according to claim 1 wherein said first and said second rings are fabricated of non-metallic material.

4. A filter bag assembly according to claim 1 wherein said filter bag seams are sewn.

5. A filter bag assembly according to claim 1 wherein said filter bag seams are welded.

6. A method of assembling a filter bag with a removable ring and handle comprising the steps of:
 (A) providing a tubular filter bag having open ends;
 (B) providing a first ring generally rectangular in cross-section;
 (C) providing a second ring, said second ring in cross-section having;
  (i) a generally flat top portion with an externally extending lip portion;
  (ii) a depending vertical portion disposed beneath said flat top portion, said depending vertical portion having an inwardly extending shelf portion disposed proximate said flat top portion, and
  (iii) a generally horizontal inwardly extending lip portion terminating said vertically depending portion, said first ring being adapted to be received within the channel formed in said second ring by said shelf portion, said depending vertical portion and said lip portion;
 (D) placing one open end of said filter bag within said first ring;
 (E) wrapping said one end of said filter bag around said first ring to cover the outer circumference thereof;
 (F) inserting said wrapped first ring into said channel formed in said second ring;
 (G) pulling the other open end of said filter bag over the flat top portion of said second ring to completely encompass said flat top portion; and
 (H) closing the other open end of said filter bag.

7. The method of assembling a filter bag according to claim 6 further including the steps of:
 (I) providing a flat piece of filter material;
 (J) folding said filter material; and
 (K) closing said filter material to form a tubular filter bag having open ends;
said steps (I), (J) and (K) being performed prior to step (A).

8. The method of assembling a filter bag according to claim 6 wherein said closing in step H is accomplished by sewing.

9. The method of assembling a filter bag according to claim 7 wherein said closing in step K is accomplished by sewing.

10. The method of assembling a filter bag according to claim 6 wherein said closing in step H is accomplished by welding.

11. The method of assembling a filter bag according to claim 7 wherein said closing in step K is accomplished by welding.

12. The method of assembling a filter bag according to claim 7 including the steps of:
 (L) providing a template; and
 (M) cutting said other end according to said template prior to step (H).

* * * * *